United States Patent [19]

Oishi

[11] 4,291,363

[45] Sep. 22, 1981

[54] GAS-INSULATED SWITCHGEAR APPARATUS

[75] Inventor: Kazuaki Oishi, Hitachi, Japan

[73] Assignee: Hitachi, Ltd., Tokyo, Japan

[21] Appl. No.: 150,098

[22] Filed: May 15, 1980

[30] Foreign Application Priority Data

May 31, 1979 [JP] Japan .................................. 54-67601
Jun. 1, 1979 [JP] Japan .................................. 54-69284

[51] Int. Cl.³ ............................................. H02B 5/02
[52] U.S. Cl. .................................................... 361/333
[58] Field of Search ............... 361/331, 332, 333, 335, 361/341, 428; 174/43 R, 45 R; 307/147; 200/48 R, 148 R, 148 B

[56] References Cited

U.S. PATENT DOCUMENTS

| | | | |
|---|---|---|---|
| 3,364,398 | 1/1968 | Stipcevich | 361/333 |
| 4,200,899 | 4/1980 | Volman | 361/333 |
| 4,237,520 | 12/1980 | Oishi | 361/333 |

Primary Examiner—Gerald P. Tolin

Attorney, Agent, or Firm—Craig and Antonelli

[57] ABSTRACT

A gas-insulated switchgear apparatus is disclosed in which three-phase power transmission lines are anchored to associated entry gantries respectively while maintaining a required vertical open-air insulation distance between the power transmission lines, and line feeder switching units for electrically connecting the power transmission lines to gas-insulated main buses disposed substantially in parallel with the extending direction of the entry gantries are arranged to extend in a horizontal direction orthogonal with respect to the axial direction of the main buses. Bushings connected to the line-side ends of the respective line feeder switching units are spaced apart from each other by a predetermined open-air insulation distance in the horizontal direction, so that the desired vertical open-air insulation distance between the power transmission lines and the desired horizontal open-air insulation distance between the external terminals of the bushings can be maintained without increasing the axial length of the main buses.

6 Claims, 11 Drawing Figures

GAS-INSULATED SWITCHGEAR APPARATUS

BACKGROUND OF THE INVENTION

This invention relates to a gas-insulated switchgear apparatus, and more particularly to improvements of its connecting section which electrically connect the switchgear main section to three-phase AC power transmission lines by means of bushings.

In modern power generating stations, power switching stations and power substations, gas-insulated switchgears are widely used as switching equipment since the area required for the installation of the station can be reduced and the maintenance of the station components can be facilitated.

In the switchgear apparatus of this kind, a suitable gas such as $SF_6$ gas having an excellent electrical insulating property is contained within a sealed vessel or enclosure of metal which is maintained at the earth potential, and high-potential loading conductors are disposed within this sealed enclosure in a relation electrically insulated from the enclosure by an electrical insulator. Due to the fact that the electrically insulating gas such as $SF_6$ gas is contained within the sealed enclosure of the gas-insulated switchgear apparatus for the purpose of electrical insulation of the high-potential loading conductors from ground, the distance required for the electrical insulation between the conductors and ground, i.e. ground insulation distance, can be greatly shortened compared with that in a conventional air-insulated switchgear apparatus employed hitherto, and the distance required for the electrical insulation between different phases, i.e. interphase insulation distance, can also be greatly shortened. Thus, the overall size or volume of the switchgear apparatus can be greatly reduced.

However, because of the fact that the main conductors of the gas-insulated switchgear are connected to the three-phase AC power transmission lines through bushings, these bushings must be spaced apart from each other by distance enough to electrically insulate the bushings from each other in open air. Each bushing includes a porcelain insulator and a central conductor. The high-potential loading conductors in the gas-insulated switchgear apparatus are connected to these central conductors of the respective bushings to terminate in individual external terminals. Therefore, the open-air insulation distance must also be taken into consideration for ensuring electrical insulation between these external terminals exposed in open air. Because of the fact that this open-air insulation distance required for the electrical insulation between the exposed external terminals is far larger than the insulation distance required within the gas insulation circumstance, this results in the loss of the merit that the insulation distance can be shortened in other conductor portions than the portions insulated by the bushings. As a consequence, the size or volume of the gas-insulated switchgear apparatus is determined primarily by the insulation distance required for electrical insulation between the bushings.

This problem will be further discussed. It is the recent tendency to operate AC power transmission lines at higher voltages to meet the growing demand for electric power, and it is also the recent tendency to increase the number of paralle power transmission lines through main route to enhance the reliability of power supply therethrough. For example, there is a project for erection of a substation employing 550-kV gas-insulated switchgear arrangement associated with six parallel power transmission lines. Such gas-insulated switchgear arrangement includes generally line feeder switching units connected to the power transmission lines, bank feeder switching units connected to transformers, bus section switching units, bus tie switching units, main bus units and connection conductors for connection between the individual units. The main bus units are arranged to extend in a direction parallel with the direction required for maintaining a sufficient insulation distance between the bushings. Therefore, an increase in the distance between the bushings or an increase in the number of the lines results in a corresponding increase in the axial length of the main bus units, and the proportion of the cost of the main bus units in the overall cost of the gas-insulated switchgear arrangement is inevitably increased resulting in a very expensive substation. For the above reasons, it is strongly demanded to ensure the required open-air insulation distance between the bushings without increasing the axial length of the main bus units.

SUMMARY OF THE INVENTION

It is an object of the present invention to provide an improved gas-insulated switchgear apparatus in which the required insulation distance between the bushings can be ensured in spite of the fact that the axial length of the main buses is shorter than hitherto.

Another object of the present invention is to provide an improved gas-insulated switchgear apparatus which comprises an improved entry gantry assembly of unique design so that the required insulation distance between the bushings can be ensured in spite of the shortened axial length of the main buses.

Still another object of the present invention is to provide an improved gas-insulated switchgear apparatus in which both the main buses and the connection conductors have a shortened axial length.

In the gas-insulated switchgear apparatus according to the present invention, bushings of the three phases are provided at the line-side ends of respective line feeder switching units extending in a direction orthogonal with respect to the axial direction of main buses while maintaining the required open-air insulation distance therebetween in the axial direction of the line feeder switching units, and the three-phase AC power transmission lines are anchored to entry gantries while maintaining a required vertical open-air insulation distance therebetween similar to that with which they are anchored to an adjacent line tower. This arrangement attains the above objects since the required open-air insulation distance between the bushings of the three phases can be maintained without increasing the axial length of the main buses.

DESCRIPTION OF THE PREFERRED EMBODIMENTS

Figure 1:
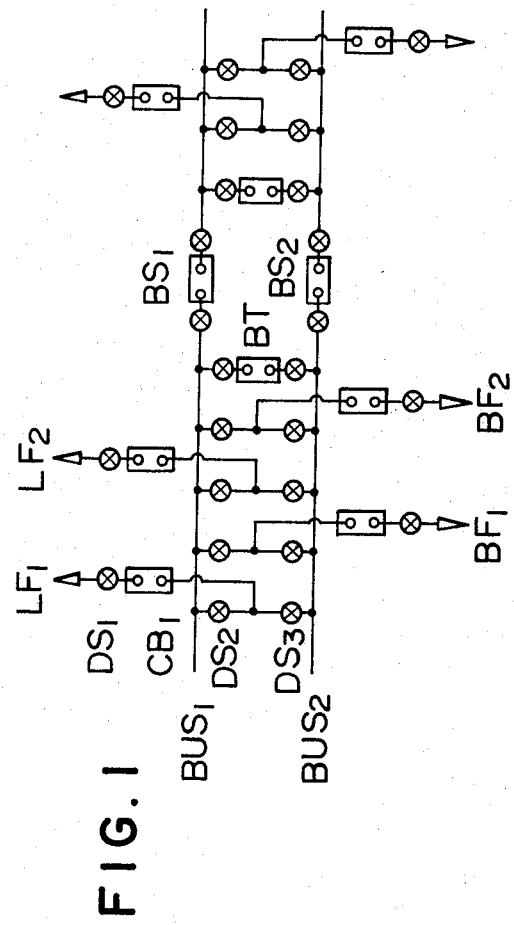
FIG. 1 is a single-phase connection diagram of components of a substation to which the present invention is applied by way of example.

FIG. 1 is a single-phase connection diagram of components of a substation of the so-called double bus system to which the present invention is applied. Referring to FIG. 1, a pair of main buses $BUS_1$ and $BUS_2$ are separated by bus sections $BS_1$ and $BS_2$ respectively. These main buses $BUS_1$ and $BUS_2$ are connected by a bus tie BT at points adjacent to the bus sections $BS_1$ and $BS_2$. A line feeder $LF_1$ connected at one end thereof to a power transmission line and is connected at the other end thereof to a point between a pair of disconnecting switches $DS_2$ and $DS_3$ connected between the main buses $BUS_1$ and $BUS_2$. Another line feeder $LF_2$ is also similarly connected. A bank feeder $BF_1$ connected at one end thereof to a transformer (not shown) is connected at the other end thereof to a point between a pair of disconnecting switches $DS_2$ and $DS_3$ connected between the main buses $BUS_1$ and $BUS_2$. Another bank feeder $BF_2$ is also similarly connected.

FIG. 1 showing the single-phase connection arrangement of the components of the substation illustrates merely an application of the present invention, and it is apparent that the present invention is also applicable to a substation having a different connection arrangement in addition to its application to a power generating station and to a power switching station.

Figure 2:
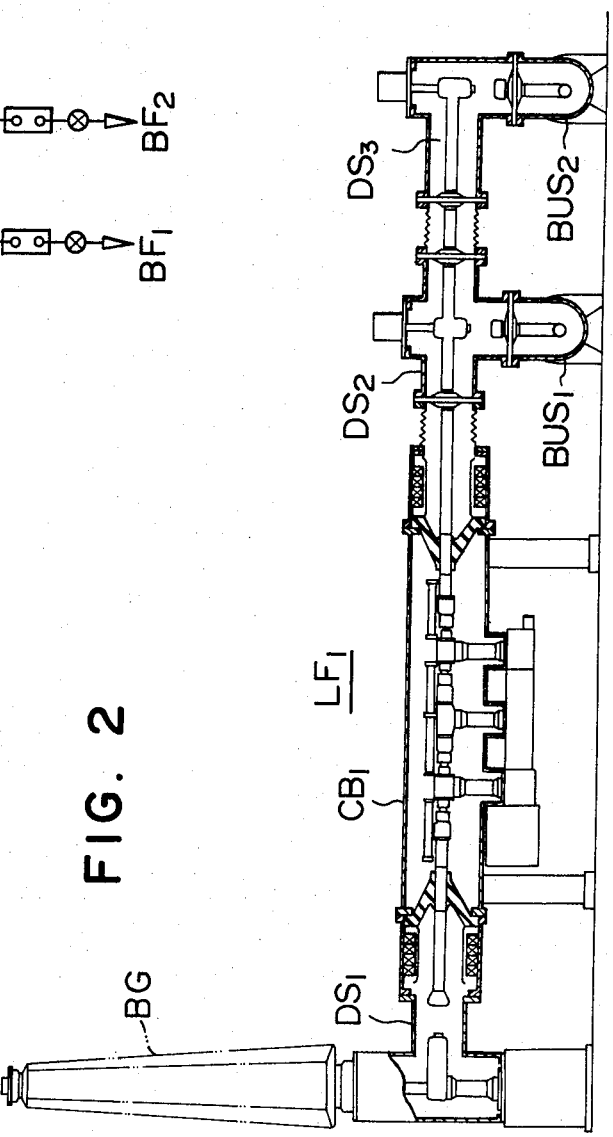
FIG. 2 is a longitudinal sectional, front elevation view of one of the line feeder switching units shown in FIG. 1.

FIG. 2 shows the practical structure of the line feeder switching unit including the line feeder $LF_1$ shown in FIG. 1. Referring to FIG. 2, the main buses $BUS_1$ and $BUS_2$ are disposed in parallel with each other along the ground. The disconnecting switches $DS_2$ and $DS_3$ are disposed above the respective main buses $BUS_1$ and $BUS_2$ and are adapted to make switching operation in a direction substantially orthogonal with respect to ground. The disconnecting switches $DS_2$ and $DS_3$ are connected at one of the contacts to the bus bars of the main buses $BUS_1$ and $BUS_2$ and at the other contact to one end of a circuit breaker $CB_1$ by a linear connection conductor extending substantially in a horizontal direction. A disconnecting switch $DS_1$ is connected to the other end of the circuit breaker $CB_1$, and a bushing BG is erected above this disconnecting switch $DS_1$. Each of the elements forming the current path is housed within a grounded vessel or enclosure of metal filled with $SF_6$ gas, and one end of the current path is connected to the central conductor of the bushing BG to terminate in an external terminal exposed in open air. Since the metallic enclosures are grounded to be maintained at the earth potential, the line feeder switching units $LF_1$ and $LF_2$ of different phases can be disposed close to each other. Due to, however, the fact that the terminals of the load current conductors are exposed in open air from the upper ends of the respective bushings BG, an open-air insulation distance between the exposed external terminals must be taken into consideration to ensure the required electrical insulation.

Figure 3:
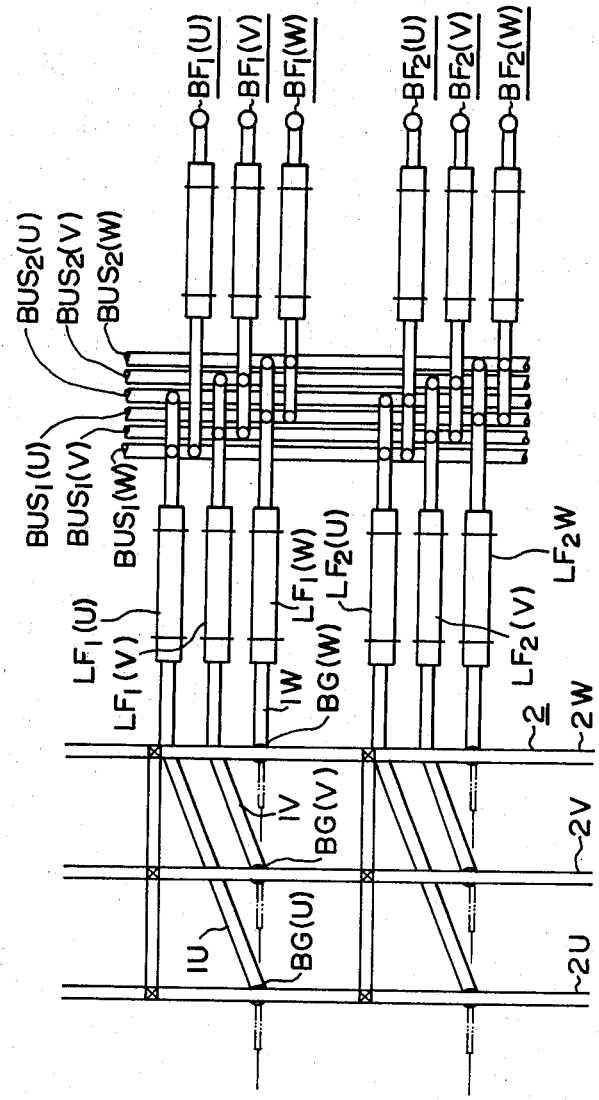
FIG. 3 is a schematic plan view of an embodiment of the gas-insulated switchgear apparatus according to the present invention.
Figure 4:
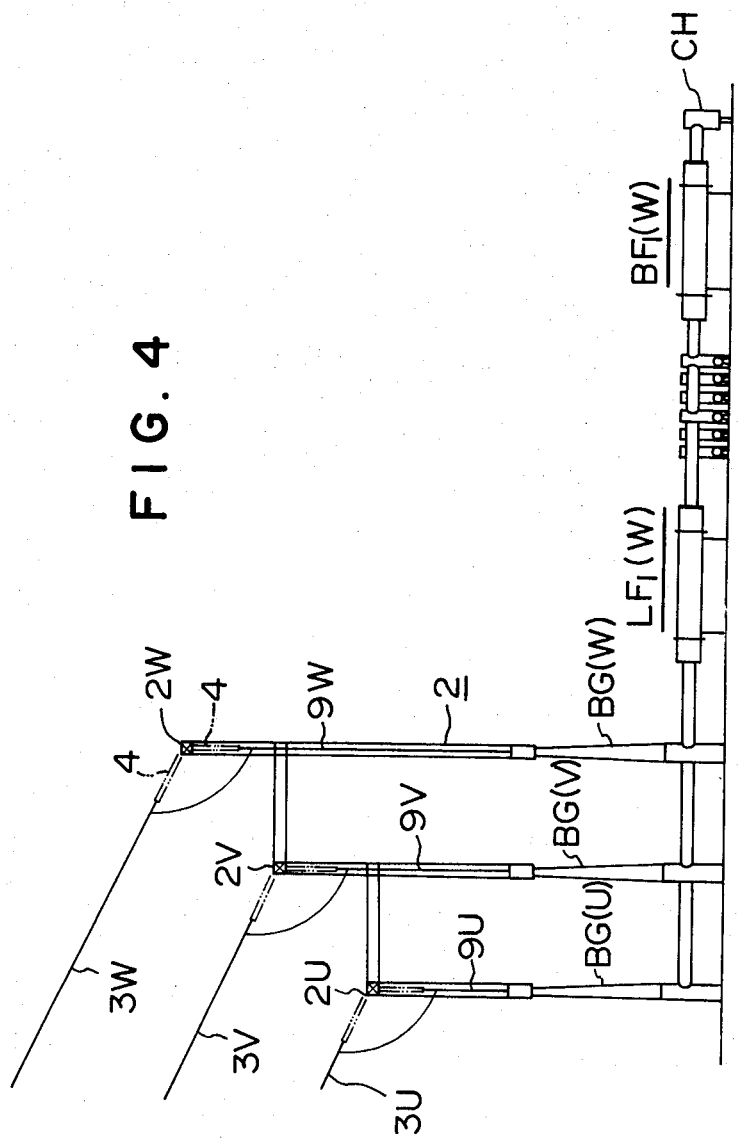
FIG. 4 is a schematic front elevation view of the embodiment shown in FIG. 3.

FIGS. 3 and 4 show an embodiment of the present invention and illustrate the practical arrangement of various elements corresponding to part of the diagram shown in FIG. 1 which illustrates only those of single phase.

Referring to FIGS. 3 and 4, the double main buses $BUS_1$ and $BUS_2$ disposed in parallel comprise main buses $BUS_1(U)$ and $BUS_2(U)$ of U-phase, main buses $BUS_1(V)$ and $BUS_2(V)$ of V-phase, and main buses $BUS_1(W)$ and $BUS_2(W)$ of W-phase corresponding to the three phases respectively. Similarly, there are line feeder switching units $LF_1(U)$, $LF_1(V)$, $LF_1(W)$, $LF_2(U)$, $LF_2(V)$ and $LF_2(W)$, and there are bank feeder switching units $BF_1(U)$, $BF_1(V)$, $BF_1(W)$, $BF_2(U)$, $BF_2(V)$ and $BF_2(W)$. The line feeder switching units $LF_1$ and $LF_2$ are disposed on one side of the main buses $BUS_1$ and $BUS_2$, while the bank feeder switching units $BF_1$ and $BF_2$ are disposed on the other side of the main buses $BUS_1$ and $BUS_2$. The ends of the bank feeder switching units $BF_1$ and $BF_2$ remote from the ends connected to the main buses $BUS_1$ and $BUS_2$ terminate in cable heads CH to be led out by way of cables. Power transmission lines 3U, 3V and 3W are supported by a line tower (not shown) in a relation vertically spaced apart from each other by a sufficient open-air insulation distance and are connected to incoming lines 9U, 9V and 9W respectively. These lines 3U, 3V, 3W, 9U, 9V and 9W are anchored to a entry gantry assembly 2 which is erected to extend in parallel with the axial direction of the main buses $BUS_1$ and $BUS_2$. This entry gantry assembly 2 comprises three entry gantries 2U, 2V and 2W which have such heights that the tower 2W nearest to the main buses $BUS_1$ and $BUS_2$ is the tallest of all, and the tower 2U remotest from the main buses $BUS_1$ and $BUS_2$ is the shortest. The three-phase power transmission lines 3U, 3V, 3W and the incoming lines 9U, 9V and 9W connected to the exposed external terminals of the bushings BG(U), BG(V) and BG(W) are anchored to the entry gantries 2U, 2V and 2W by anchoring insulators 4 respectively. The entry gantries 2U of U-phase, 2V of V-phase and 2W of W-phase extend in parallel with the corresponding main buses $BUS_1$ and $BUS_2$ and are spaced apart from each other by a required open-air insulation distance. Further, the heights of the entry gantries 2U, 2V and 2W are so determined as to ensure a required vertical open-air insulation distance between the power transmission lines 3U, 3V and 3W. The bushings BG(U) of U-phase, BG(V) of V-phase and BG(W) of W-phase are disposed in a substantially aligned relation beneath the entry gantries 2U, 2V and 2W. The central conductors of the bushings BG(U), BG(V) and BG(W) are connected to the circuit breakers $CB_1$ in the line feeder switching units $LF_1(U)$, $LF_1(V)$ and $LF_1(W)$ by connection conductors 1U, 1V and 1W respectively. There are two factors that must be taken into consideration in the above arrangement. One of the factors is the vertical open-air insulation distance between the power transmission lines 3U, 3V and 3W, and the other is the open-air insulation distance between the exposed external terminals of the bushings BG(U), BG(V) and BG(W).

In the arrangement shown in FIGS. 3 and 4, the power transmission lines 3U, 3V and 3W connected to the incoming lines 9U, 9V and 9W are anchored to the entry gantries 2U, 2V and 2W respectively in the relation spaced apart from each other in the vertical direction. In contrast, in the case of a prior art gas-insulated switchgear apparatus, such power transmission lines 3U, 3V and 3W have been connected to the associated bushing conductors BG(U), BG(V) and BG(W) in a horizontally parallel relation after being twisted through an angle of about 90°. In the arrangement shown in FIGS. 3 and 4, however, the power transmission lines 3U, 3V and 3W supported in the vertically spaced apart relation on the line tower (not shown) are guided toward and anchored to the entry gantries 2U, 2V and 2W while maintaining the vertical open-air insulation distance therebetween. Therefore, the vertical open-air insulation distance between the power transmission lines 3U of U-phase, 3V of V-phase and 3W of W-phase are indepondent of the axial length of the main buses BUS. Further, the bushings BS(U), BG(V) and BG(W) are spaced apart from each other by the required open-air insulation distance in the horizontal direction orthogonal with respect to the axial direction of the line feeder switching units LF, hence, the axial direction of the main buses BUS. Therefore, the open-air insulation distance between the exposed external terminals of the bushings BG(U) of U-phase, BG(V) of V-phase and BG(W) of W-phase is also independent of the axial length of the main buses BUS. Thus, the open-air insulation distance between the bushings BG connected to the line feeder switching units $LF_1$ and $LF_2$ in FIG. 3 is the sole factor affecting the axial length of the main buses BUS, and the axial length of the main buses BUS can be greatly shortened.

Figure 5:
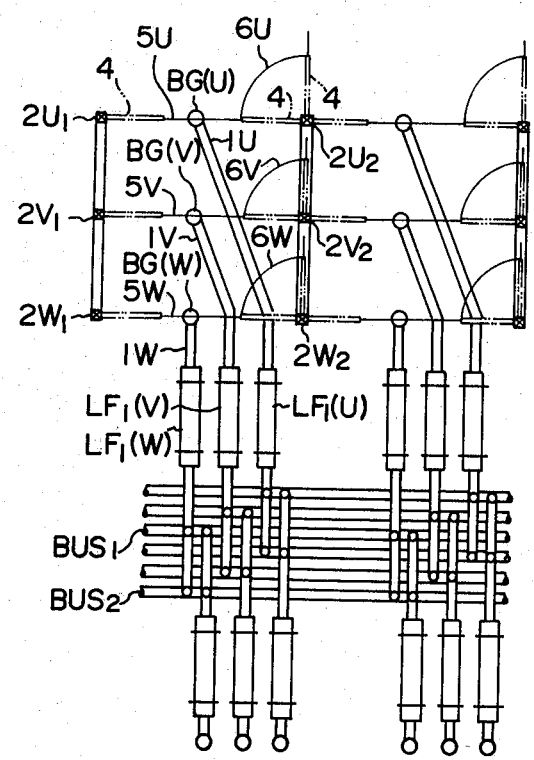
FIG. 5 is a schematic plan view of another embodiment of the gas-insulated switchgear apparatus according to the present invention.
Figure 6:
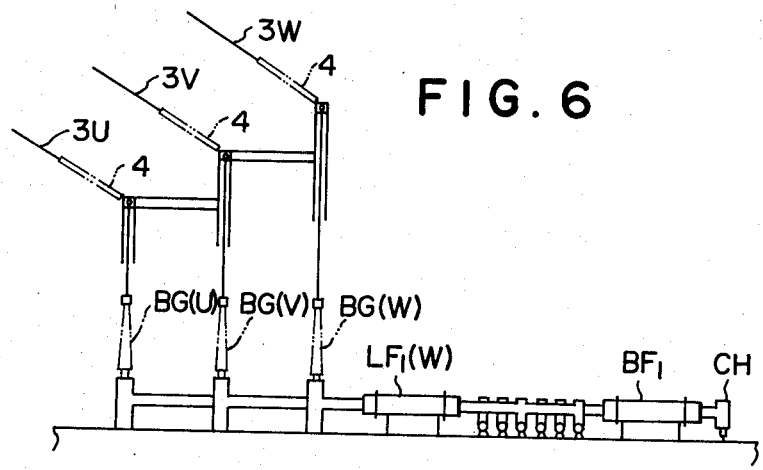
FIG. 6 is a schematic front elevation view of the embodiment shown in FIG. 5.

FIGS. 5 and 6 show another embodiment which is an improvement of the embodiment shown in FIGS. 3 and 4. In the embodiment shown in FIGS. 3 and 4, the power transmission lines 3U of U-phase, 3V of V-phase and 3W of W-phase are anchored by the anchoring insulators 4 to the respective entry gantries 2U, 2V and 2W in the same vertical plane. Due to this manner of anchoring, the arcuate portion of the incoming line 9 supported on one of the towers 2 by the two anchoring insulators 4 must be sufficiently spaced apart from the adjacent tower to provide the required open-air insulation distance between them, and hence the entry gantries 2W and 2V are required, to be extremely taller relative to the towers 2V and 2U, respectively. The embodiment shown in FIGS. 5 and 6 improves this problem. Referring to FIGS. 5 and 6, the incoming direction of the power transmission lines 3U, 3V and 3W is changed before being connected to the associated bushings BG(U), BG(V) and BG(W) so that they run substantially in parallel with the main buses BUS. This improved arrangement will be described with reference to the line feeder switching units $LF_1(U)$, $LF_1(V)$ and $LF_1(W)$, by way of example. The portions of the entry gantries 2U, 2V and 2W associated with these line feeder switching units $LF_1(U)$, $LF_1(V)$ and $LF_1(W)$ include three sets of entry towers $2U_1$-$2U_2$, $2V_1$-$2V_2$ and $2W_1$-$2W_2$ arranged opposite to each other. Three auxiliary incoming lines 5U, 5V and 5W are anchored by anchoring insulators 4 to the respective sets of entry towers $2U_1$-$2U_2$, $2V_1$-$2V_2$ and $2W_1$-$2W_2$ and are electrically connected to the respective power transmission lines 3U, 3V and 3W. In this arrangement, arcuate portions 6U, 6V and 6W connecting between the lines 3U, 3V, 3W and the lines 5U, 5V and 5W respectively are located in the horizontal plane, and therefore the required open-air insulation distance between the arcuate portion of each phase and the entry gantry of the adjacent phase can be maintained without making extremely taller the towers relative to the adjacent towers. Therefore, the relative heights of the entry gantries 2U, 2V and 2W can be made lower than those in the embodiment shown in FIGS. 3 and 4.

Figure 8:
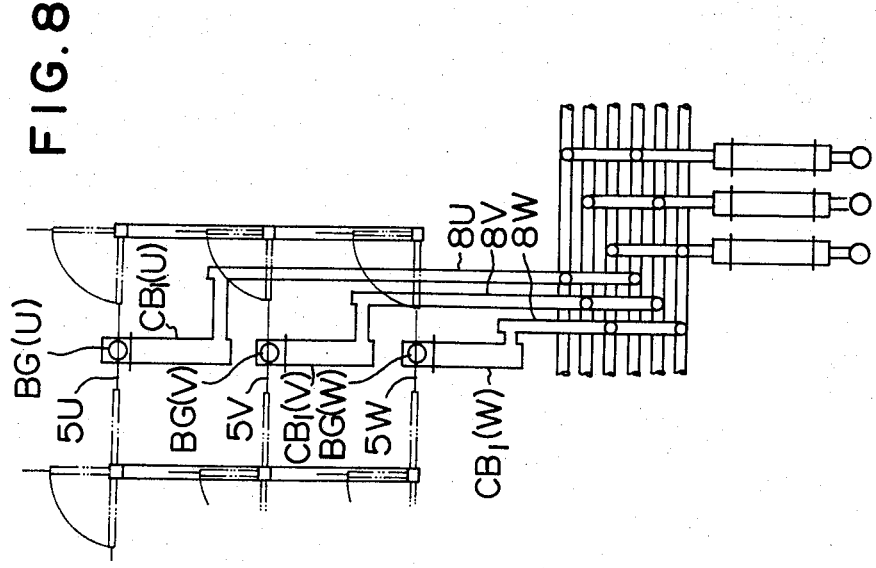
FIGS. 7 to 9 are schematic plan views of other embodiments respectively of the gas-insulated switchgear apparatus according to the present invention.
Figure 7:
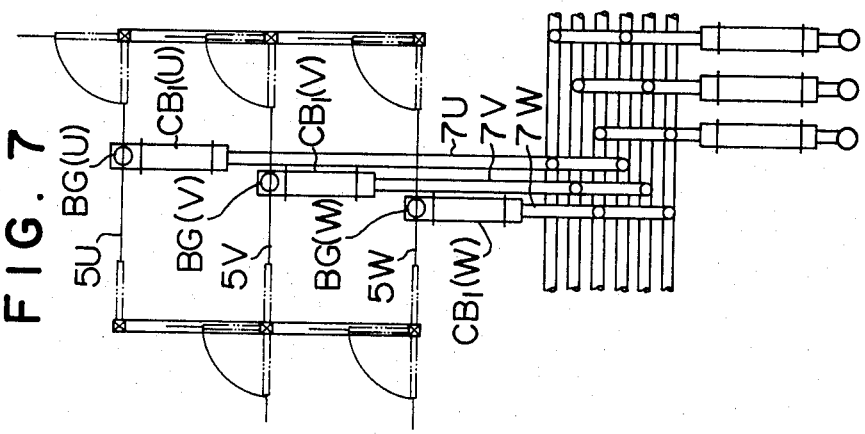

Embodiments shown in FIGS. 7 and 8 respectively exhibit also the same effect. In the embodiment shown in FIG. 7, the positions of the circuit breakers $CB_1(U)$, $CB_1(V)$ and $CB_1(W)$ in the respective line feeder switching units $LF_1(U)$, $LF_1(V)$ and $LF_1(W)$ are displaced relative to each other as shown. These circuit breakers $CB_1(U)$, $CB_1(V)$ and $CB_1(W)$ are arranged to greatly decrease the axial length of the connection conductors 1U, 1V and 1W shown in FIG. 3 and are connected to the main buses $BUS_1(U)$, $BUS_1(V)$ and $BUS_1(W)$ by connection conductors 7U, 7V and 7W respectively. Although the open-air insulation distance between the bushings BG(U), BG(V) and BG(W) extends at a slight angle with respect to the axial direction of the line feeder switching units $LF_1(U)$, $LF_1(V)$ and $LF_1(W)$ in this arrangement, the effect of this embodiment is substantially the same as that of the embodiment shown in FIGS. 5 and 6.

The embodiment shown in FIG. 8 is an improvement of the embodiment shown in FIG. 7. Referring to FIG. 8, the circuit breakers $CB_1(U)$, $CB_1(V)$, $CB_1(W)$ and the bushings BG(U), BG(V), BG(W) are disposed in a substantially aligned relation, and the circuit breakers $CB_1(U)$, $CB_1(V)$ and $CB_1(W)$ are connected to the main buses $BUS_1(U)$, $BUS_1(V)$ and $BUS_1(W)$ by curved connection conductors 8U, 8V and 8W respectively. According to this embodiment, the length of the auxiliary incoming lines 5U, 5V and 5W can be made shorter than that in the embodiment shown in FIG. 7.

Figure 9:
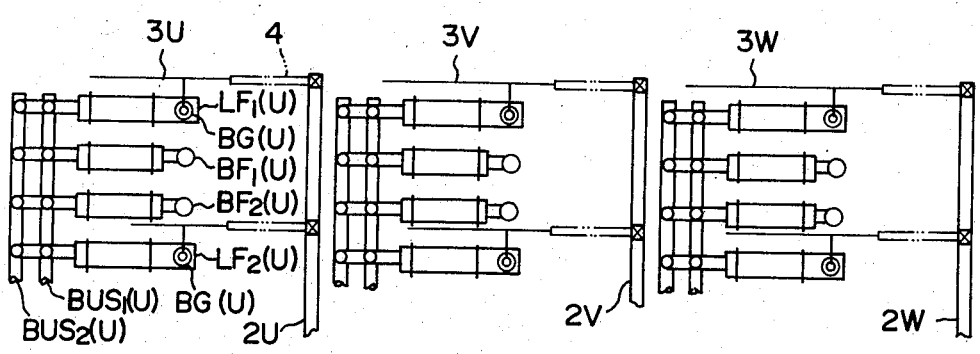
Figure 10:
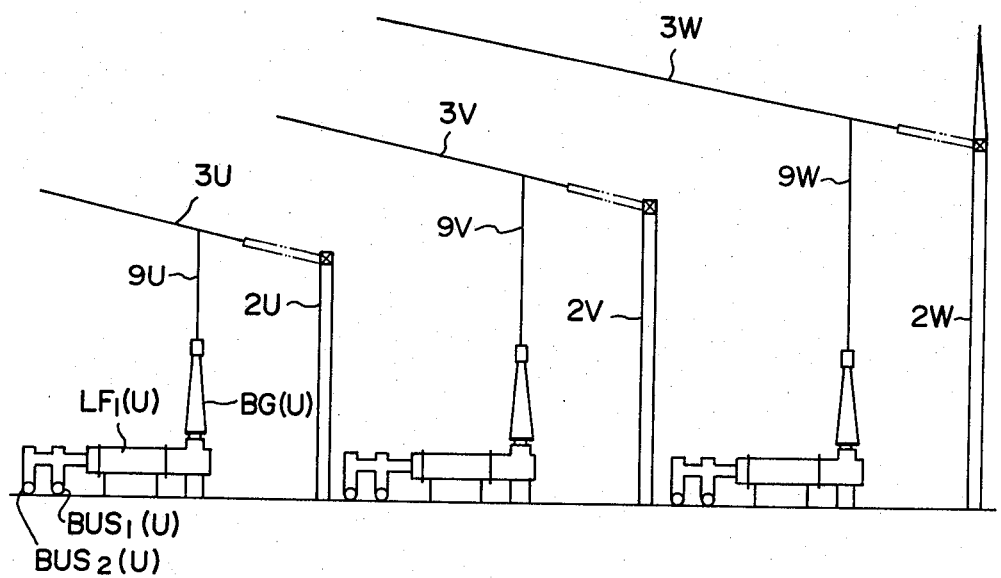
FIG. 10 is a schematic front elevation view of the embodiment shown in FIG. 9.

FIGS. 9 and 10 show still another embodiment of the gas-insulated switchgear apparatus according to the present invention. In the embodiments described hereinbefore, the similar components of the three phases are disposed in a unit. The embodiment shown in FIGS. 9 and 10 differs from the aforementioned embodiments in that the different components of the same phase are disposed in a unit. More precisely, although the bushings BG(U), BG(V) and BG(W) are disposed at the same area displaced from the area for the remaining components of the apparatus in the embodiment shown in FIGS. 3 and 4, such remaining components for each phase of the apparatus are disposed in a unit together with the bushing BG of the same phase in the embodiment shown in FIGS. 9 and 10. Since the components of U-phase, V-phase and W-phase have similar arrangements, those of U-phase will now be only described.

Referring to FIGS. 9 and 10, the main buses $BUS_1(U)$ and $BUS_2(U)$ of U-phase arranged according to the double bus system are disposed in parallel with each other, and the line feeder switching units $LF_1(U)$, $LF_2(U)$, and bank feeder switching units $BF_1(U)$, $BF_2(U)$ are connected to the main buses $BUS_1(U)$ and $BUS_2(U)$ respectively in such a relation that their axes extend in a direction orthogonal with respect to the axial direction of the main buses $BUS_1(U)$ and $BUS_2(U)$. The bus tie switching unit BT(U) (not shown) is also connected between the main buses $BUS_1(U)$ and $BUS_2(U)$. Especially, the line feeder switching units $LF_1(U)$ and $LF_2(U)$ each having the bushing BG(U) connected thereto are so disposed that the housings BG(U) are spaced apart by the required open-air insulation distance from each other, and the remaining units not having the bushings BG(U) are disposed between these line feeder switching units $LF_1(U)$ and $LF_2(U)$. The entry gantry 2U exclusive use for the U-phase is erected in paralle 1 with the main buses $BUS_1(U)$ and $BUS_2(U)$ at a position near to the ends of the individual units opposing to their ends connected to the main buses $BUS_1(U)$ and $BUS_2(U)$. The power transmission lines 3U of U-phase are anchored to this entry gantry 2U by the anchoring insulators 4 as shown in FIG. 10. The power transmission lines 3U anchored to the tower 2U are connected to the exposed external terminals of the bushings BG(U) respectively. The power transmission lines 3U of U-phase, 3V of V-phase and 3W of W-phase are vertically spaced apart from each other by the required open-air insulation distance as in the aforementioned embodiments, and the bushings BG(U) of U-phase, BG(V) of V-phase and BG(W) of W-phase are also horizontally spaced apart from each other by the required open-air insulation distance in the direction orthogonal with respect to the axial direction of the main buses. Thus, the axial length of the main buses need not be increased in spite of the requirements for providing the required open-air insulation distance between the power transmission lines of the three phases and between the bushings of the three phases. It is the important feature of the present embodiment that the axial length of the main buses can be further shortened by grouping the components according to the phase. In the previous embodiments, between two units of the same phase, for example, the line feeder switching units $LF_1(U)$ of U-phase and the bank feeder switching unit $LF_2(U)$ of U-phase, there exist the line feeder switching units $LF_1(V)$ of V-phase and $LF_1(W)$ of W-phase. For this reason, each of the main buses BUS requires an extra portion which extends over the components of other phases so as to connect the components of the adjacent units in the same phase. However, in the embodiment shown in FIGS. 9 and 10, the main buses BUS do not require such an extra portion extending over the components of other phases. Therefore, the axial length of the main buses BUS can be greatly shortened. Further, the axial length of the connection conductors in the individual units can also be shortened, as will be described with reference to FIG. 11.

Figure 11:
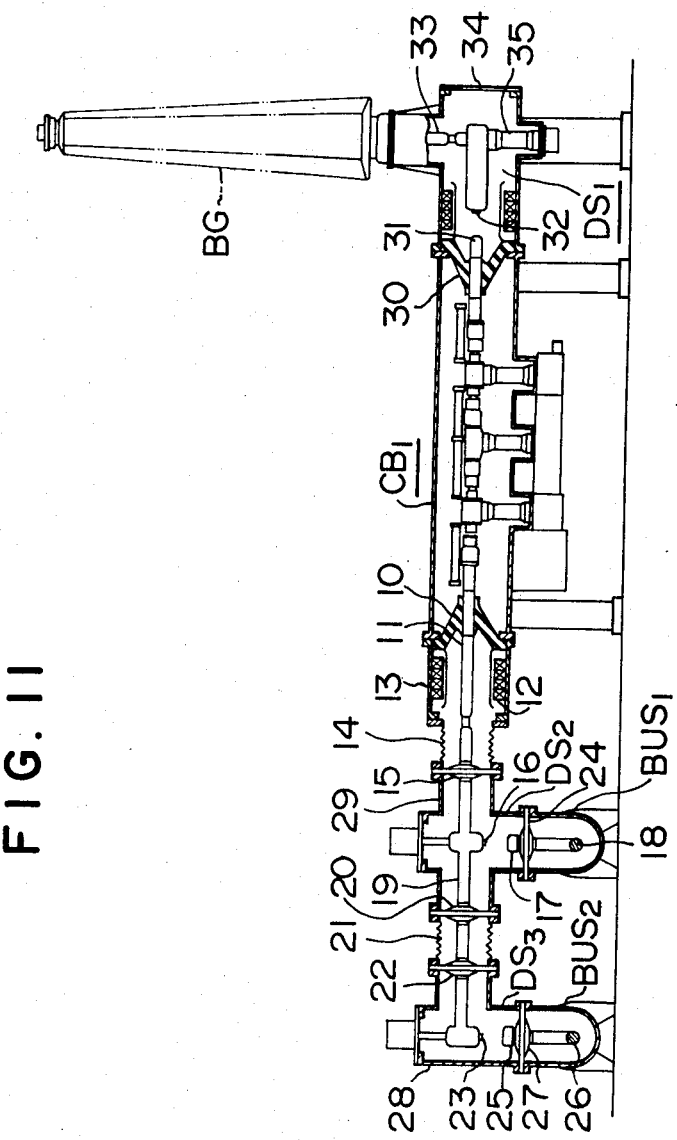
FIG. 11 is a longitudinal sectional, front elevation view of one of the line feeder switching units shown in FIG. 9.

FIG. 11 shows the detailed structure of one of the line feeder switching units $LF_1$ of U-phase. Referring to FIG. 11, the circuit breaker $CB_1$ disposed in the horizontal direction in the line feeder switching unit $LF_1(U)$ is hermetically sealed at one end thereof by a spacer 30 of electrical insulator, and the fixed contact 31 of the disconnecting switch $DS_1$ is mounted on a conductor buried in the insulating spacer 30. The movable contact 32 of the disconnecting switch $DS_1$ is movably supported by a supporting member 35 of electrical insulator for making switching operation, and this movable contact 32 is electrically connected to the central conductor 33 of the bushing BG(U) erected on an enclosure 34 of metal enclosing the disconnecting switch $DS_1$. The circuit breaker $CB_1$ is hermetically sealed at the other end thereof by another spacer 10 of electrical insulator, and a conductor 11 buried in this insulating spacer 10 is electrically connected to a connection conductor 19 extending linearly along the central axis of the circuit breaker $CB_1$. A current transformer 12 surrounding the buried conductor 11 is disposed within an enclosure 13 of metal, and this enclosure 13 is connected through a bellows 14 to an enclosure 29 of metal enclosing the disconnecting switch $DS_2$. This enclosure 29 is connected through another bellows 21 to an enclosure 28 of metal enclosing the third disconnecting switch $DS_3$. The enclosures 29 and 13 are separated gas-impermeably by another spacer 15 of electrical insulator, and the enclosures 28 and 29 are also separated gas-impermeably by two spacers 20 and 22 of electrical insulator. The movable contact 16 of the disconnecting switch $DS_2$ is electrically connected to the connection conductor 19, and its fixed contact 17 is electrically connected to the bus bar 18 of the main bus enclosures $BUS_1$. The main bus enclosure $BUS_1$ and the disconnecting switch enclosure $DS_2$ are separated gas-impermeably by a spacer 24 of electrical insulator. The disconnecting switch $DS_3$ is electrically connected at its movable contact 23 to the connection conductor 19 and at its fixed contact 25 to the bus bar 26 of the main bus $BUS_2$. The disconnecting switch enclosure $DS_3$ and the main bus enclosure $BUS_2$ are also separated gas-impermeably by a spacer 27 of electrical insulator.

It is to be noted that the main buses $BUS_1(U)$ and $BUS_2(U)$ of U-phase are only present in the vicinity of the line feeder switching unit $LF_1(U)$ of U-phase in spite of the fact that the main buses are arranged according to the double bus system and the components are grouped according to the phase. In other words, no main buses of other phases are present between these main buses $BUS_1(U)$ and $BUS_2(U)$ of U-phase. Therefore, the axial length of the connection conductor 19 connecting between the disconnecting switches $DS_2$ and $DS_3$ can be greatly shortened in spite of the fact that the main buses are arranged according to the double bus system and the components are grouped according to the phase. It will be also seen from FIGS. 9 and 10 that the elements in the individual units grouped according to the phase can have the entirely same structure.

In the embodiment shown in FIGS. 9 and 10, the bank feeder switching units BF are connected by cables to transformers (not shown). The transformers may be disposed between the associated bank feeder switching units BF and the associated entry gantry 2, and the transformers may be connected to the bank feeder switching units BF by connection buses or cables.

I claim:

1. A gas-insulated switchgear apparatus comprising:
   (a) three-phase gas-insulated main buses extending substantially along a straight path;
   (b) line feeder switching units corresponding to the three phases respectively, said line feeder switching units being arranged to extend in a horizontal direction orthogonal with respect to the axial direction of said gas-insulated main buses and connected at one end thereof to said gas-insulated main buses respectively;
   (c) three entry gantries of respectively different heights for anchoring three-phase AC power transmission lines respectively while maintaining a required vertical open-air insulation distance between said power transmission lines, said entry gantries being spaced apart from each other by a predetermined open-air insulation distance in said horizontal direction and disposed in such a relation that a taller one of them anchors a higher one of said power transmission lines and is located at a position remoter than that of the next adjacent one in the incoming direction of said power transmission lines;

(d) bushings connected to the other end of said three-phase line feeder switching units respectively, each of said bushings being connected with the corresponding entry gantry of the same phase while being spaced apart from the next adjacent one by a predetermined open-air insulation distance in said horizontal direction;

(e) means for anchoring said power transmission lines to said entry gantries in such a relation that the higher one of said power transmission lines is anchored to the taller one of said entry gantries; and (f) incoming lines electrically connecting said power transmission lines of the three phases to the external terminals of said bushings of the corresponding phases respectively.

2. A gas-insulated switchgear apparatus as claimed in claim 1, wherein said three entry gantries extend in parallel with the axial direction of said gas-insulated main buses respectively, and the one nearer to said gas-insulated main buses has a height greater than that of the next adjacent one.

3. A gas-insulated switchgear apparatus as claimed in claim 1, wherein said line feeder switching units of the three phase are juxtaposed in the direction orthogonal with respect to the axial direction of said gas-insulated main buses and are electrically connected to said bushings of the corresponding phases by gas-insulated connection conductors of different axial lengths respectively.

4. A gas-insulated switchgear apparatus as claimed in claim 1, wherein each of said line feeder switching units includes a circuit breaker of the corresponding phase connected at one end thereof to the bushing of the corresponding phase and a gas-insulated connection conductor connecting said circuit breaker to the gas-insulated main bus of the corresponding phase, said circuit breakers of the three phases being displaced from each other in said horizontal direction, and said gas-insulated connection conductors of the three phases have respectively different axial lengths.

5. A gas-insulated switchgear apparatus comprising:
(a) three-phase gas-insulated main buses extending substantially along a straight path;
(b) line feeder switching units corresponding to the three phases respectively, said line feeder switching units being arranged to extend in a horizontal direction orthogonal with respect to the axial direction of said gas-insulated main buses and connected at one end thereof to said gas-insulated main buses respectively;
(c) three entry gantries of respectively different heights for anchoring three-phase AC power transmission lines while maintaining a required vertical open-air insulation distance between said power transmission lines, each of said entry gantries including a pair of entry towers disposed opposite to each other on a line parallel with the axial direction of said gas-insulated main buses, and an auxiliary incoming line anchored between said entry towers, said entry gantries being spaced apart from each other by a predetermined open-air insulation distance in said horizontal direction and disposed in such a relation that a taller one of said entry tower pairs is located at a position remoter than that of the next adjacent one in the incoming direction of said power transmission lines;
(d) bushings connected to the other end of said three-phase line feeder switching units respectively, each of said bushings being connected with the corresponding entry gantry of the same phase while being spaced apart from the next adjacent one by a predetermined open-air insulation distance in said horizontal direction;
(e) means for anchoring said power transmission lines to said entry gantries in such a relation that the higher one of said power transmission lines is anchored to the taller one of said entry tower pairs; and
(f) incoming lines electrically connecting said power transmission lines of the three phases to the external terminals of said bushings of the corresponding phases through said auxiliary incoming lines respectively.

6. A gas-insulated switchgear apparatus comprising:
(a) a phase-separating structure of three-phase units spaced from each other in a horizontal direction, each of said units including a gas-insulated main bus of one of the three phases extending substantially along a straight path, a line feeder switching unit of the same phase extending in said horizontal direction orthogonal with respect to the axial direction of said gas-insulated main bus and connected at one end thereof to said gas-insulated main bus, and a bushing of the same phase connected to the other end of said line feeder switching unit;
(b) three entry gantries erected adjacent to said bushings of the corresponding phases respectively and extending substantially in parallel with the axial direction of said gas-insulated main buses, said entry gantries of the three phases having heights progressively increased in a direction away from the incoming direction of power transmission lines;
(c) means for anchoring said power transmission lines of the three phases to said entry gantries of the corresponding phases respectively in such a relation that a higher one of said power transmission lines is anchored to a taller one of said entry gantries; and
(d) incoming lines electrically connecting said power transmission lines of the three phases to the external terminals of said bushings of the corresponding phases respectively.

* * * * *